United States Patent [19]
Heitkamp et al.

[11] 4,435,366
[45] Mar. 6, 1984

[54] METHOD AND APPARATUS FOR CONCENTRATION OF TRACE MATERIAL FROM LARGE WATER VOLUMES

[75] Inventors: Dieter Heitkamp; Klaus Wagener, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 262,828

[22] Filed: May 12, 1981

Related U.S. Application Data

[63] Continuation of Ser. No. 104,811, Dec. 18, 1979, abandoned.

[30] Foreign Application Priority Data

Apr. 7, 1979 [DE] Fed. Rep. of Germany ....... 2914203

[51] Int. Cl.³ .............................................. B01D 15/02
[52] U.S. Cl. ...................................... 423/6; 210/675; 210/682; 210/189

[58] Field of Search ................... 210/189, 198.1, 484, 210/671, 675, 679, 680, 682, 911–914, 924; 423/6, 7

[56] References Cited

U.S. PATENT DOCUMENTS 3,976,570  8/1976  McCray .............................. 210/671
4,176,058  11/1979 Grobler ............................... 210/747

Primary Examiner—Ivars C. Cintins
Attorney, Agent, or Firm—Becker & Becker, Inc.

[57] ABSTRACT

Method of and apparatus for concentration of trace material from large volumes of water. Carrier bodies having a lower density than that of water are introduced into a water layer, especially a natural sea current or stream; these carrier bodies are collected again after an automatic traversal of the sea flow or water layer under conditions determined by density differing from that of water. The carrier bodies are loaded and charged by depositing or accumulation of trace material, e.g. uranium concentration, on the carrier bodies. The carrier bodies are then conveyed to a further treatment location for isolating the accumulated and concentrated trace material. The carrier bodies are then again discharged into the flow or stream after being depleted.

12 Claims, 10 Drawing Figures

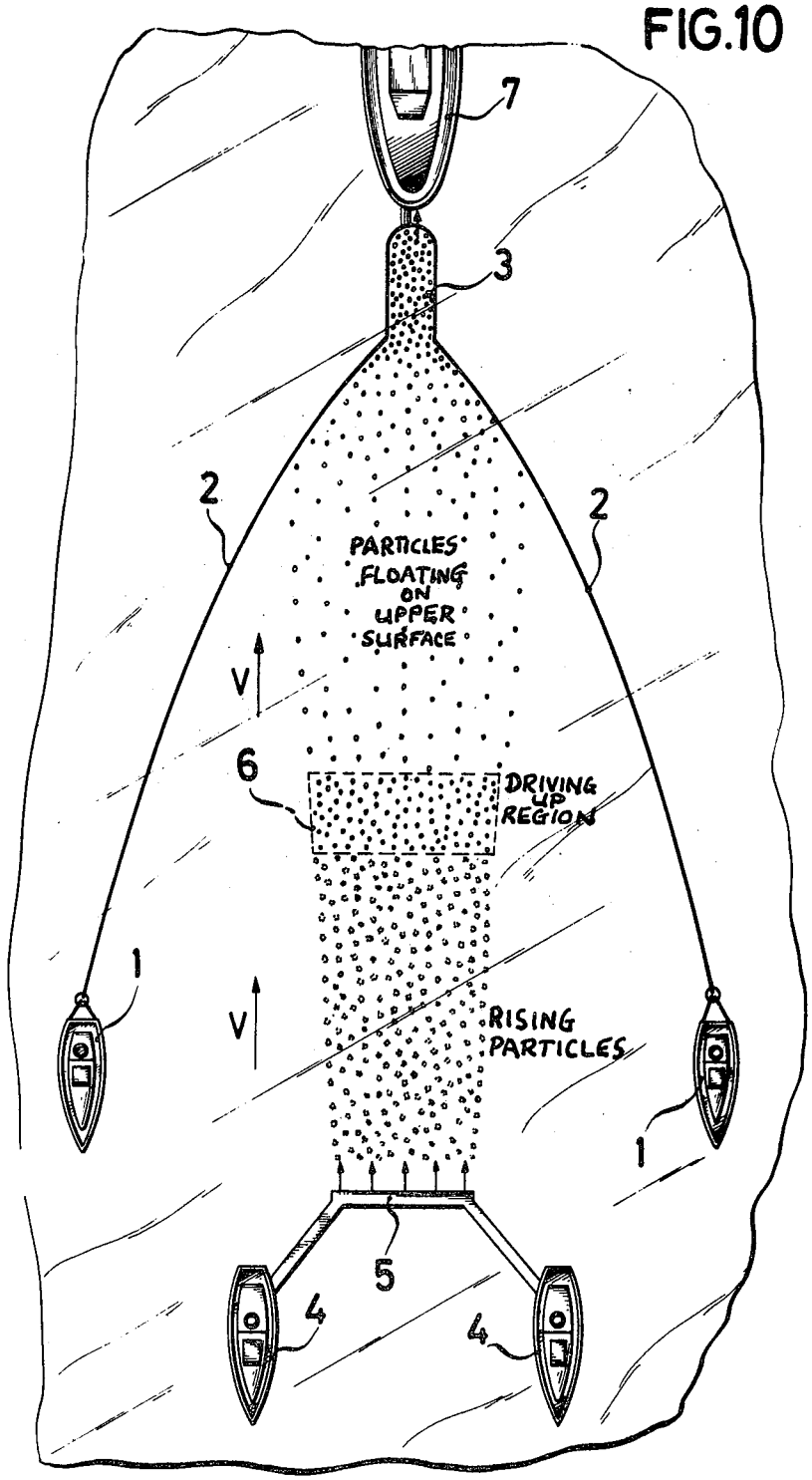

METHOD AND APPARATUS FOR CONCENTRATION OF TRACE MATERIAL FROM LARGE WATER VOLUMES

The present application is a continuation of parent application Ser. No. 104,811—Dieter Heitkamp, et al—filed Dec. 18, 1979, now abandoned.

The present invention relates to a method of concentration or enrichment of trace material from large water quantities, especially sea water, by accumulation on carrier bodies. The invention furthermore encompasses an apparatus for carrying out the method.

A concentration of trace materials can serve for decontamination purposes, especially, however, for recovering raw materials, such as, for example, uranium, from sea water. For these purposes, large water volumes are brought into contact with adsorber particles suitable for trace material fixation. With known methods, such adsorber particles are introduced either as fill in a so-called fixed bed (for instance R. V. Davies et al, Nature 203, 1110–1115 (1964)), which fixed bed has water quantities flowing therethrough, or the upwardly guided flow maintains the adsorber particles suspended in a so-called fluid bed (German Offenlegungsschriften or disclosures Nos. P2750428 and P2550751.1), or the adsorber particles are exposed to the flow in a filter cage (German Pat. No. P2441479). These methods require large structures, or structures resistant to the flowing water quantities or masses.

With a further method according to copending U.S. patent application Ser. No. 104,812—Heitkamp et al filed Dec. 18, 1979 (on even date herewith), the adsorber particles are discharged unprotected into the open flow, whereby the adsorber particles sink downwardly in the water by gravity, and at a predetermined depth are collected again by a catching device. For this purpose, a catching device located below the surface of the water is needed at a predetermined depth, as is a device for further conveying the adsorber particles for treatment and renewed release into the flow. Furthermore, a control is necessary, but not easily realized, for those particles which drift away during the sinking step and would fall next to the catching device.

It is therefore an object of the present invention to provide such an embodiment and arrangement of the disclosed concentration method that catching and control of the particles are made easier.

This object, and other objects and advantages of the present invention, will appear more clearly from the following specification in connection with the accompanying drawings, in which:

FIG. 10 is a plan view of the plant of FIG. 9.

Figure 1:
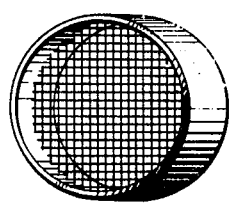
FIG. 1 shows an annular or ring body provided with a net or grid for use in accordance with the present invention.

The inventive method is characterized primarily in that carrier bodies having a lower density or specific gravity than water (sea water) are discharged into a water layer, especially a natural sea current; after an automatic traversal thereof (conditioned by the density differing from that of water), the carrier bodies are collected again and, in a loaded or charged state, are conveyed to a further treatment to isolate the concentrated trace material; the carrier bodies are then again returned into the current or stream after, as the case may be, suitable depletion or removal of the concentrated material.

The solid material particles used for concentration, which here are designated as "carrier bodies" or "adsorber particles", are to have a capability for concentration of predetermined trace materials as with the method according to copending U.S. application Ser. No. 104,812—Heitkamp et al filed concurrently herewith. In this connection, the special nature of the concentration procedure (by physical and/or chemical forces) should not be considered to have any decisive meaning for the inventive method. The concentrating solid particles are subsequently simply referred to as "carrier bodies", and it is preconditioned that these carrier bodies have concentration active centers arrestingly provided thereon or therein, with the centers themselves being suitably comprised in concentration active material, especially in the form of thin surface layers (upper surface layers) which are freely accessible for the water, yet are protected against mechanical attack by neighboring particles.

The carrier bodies have a density differing from that of water for attaining a suitable lift of the particles, with the aid of which the automatic traversal of the water layer is attained under appropriate requirements (for example, in time correlated with the trace material accumulation from the surrounding water). These carrier bodies can have a suitable form and size, whereby the size is expediently approximately one to ten centimeters. Naturally, however, larger or smaller carrier bodies are also usable. Criteria for the selection of specific carrier bodies are, in particular, a large ratio of enrichment active surfaces to volume, easy filterability or retention property of the carrier bodies, and the thickness of the hydrodynamic boundary layers on the enrichment active surfaces, which thickness depends upon the carrier body dimensions and should be as thin as possible. The carrier bodies may comprise a highly porous material.

A form of the carrier bodies as a ring is especially suitable for this method. If the concentration active material is mechanically wear resistant, the ring for example can be embodied as a torus. Otherwise, cylindrical rings may be more purposeful which are covered only upon the inner mantle surface thereof with concentration active material, so that wear, abrasion or removal of the active layer by mechanical contact with neighboring bodies is precluded. A ring has the advantage that the thickness of the stagnating hydrodynamic boundary layer on the active surface of the carrier bodies, even with larger carrier bodies, can be kept small. Since this boundary layer is also responsible for a quick loading or charging of the carrier body with trace materials, which are to be concentrated, the boundary layer should be as thin as possible. Especially advantageous are carrier bodies having thread, filament, or fiber structures, for example like the net or grid shown in FIG. 1, or like fiber fillings enclosed in a casing, as for example shown in FIG. 6. In this case, the characteristic dimension for the thickness of the boundary layer is determined by the fiber thickness. The characteristic dimension for the thickness of the boundary layer with cylindrical rings is given by the mantle height or ring thickness, and with a torus is given or provided by the diameter of the generating circle. On the other hand, for the retention capability of the carrier bodies floating on the upper surface through the grid, or the filtering capability thereof during the subsequent chemical process on board a ship, the (larger) ring diameter is determinative and is selected in such a way that the openings (mesh) of the particular retention device (grid or filter) need not be dimensioned too small. This serves the purpose of keeping the flow resistance of the grids or filters small.

An especially advantageous behavior of such a ring for trace material concentration exists when its (pole-) axis remains practically in the direction of movement. In order to attain such a condition, the center of gravity of the ring should lie upon the axis thereof but in a predetermined spacing from the center of symmetry. A still further improvement can be attained when the ring or carrier bodies are forced into an automatic spinning or "spiral" movement.

Figure 2:
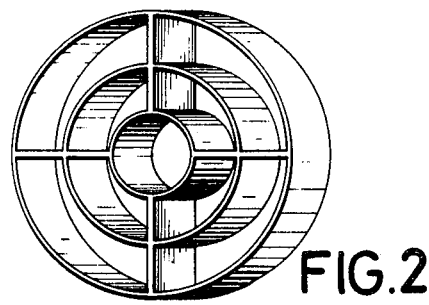
FIG. 2 shows another annular body provided with concentric rings interconnected by radial struts for use in accordance with the teaching of the present invention.
Figure 3:
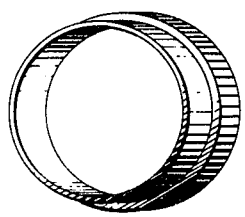
FIG. 3 shows an annular body having an additional ring located on the outer periphery at one end thereof for purposes of the present invention.
Figure 4:
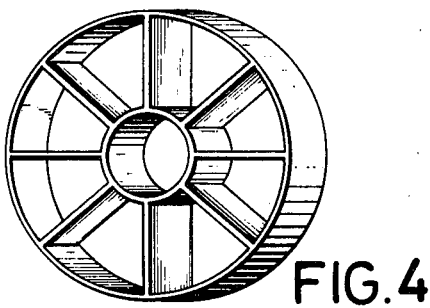
FIG. 4 shows an annular body having radial struts and a central annular ring-shaped hub for use in accordance with the present invention.
Figure 5:
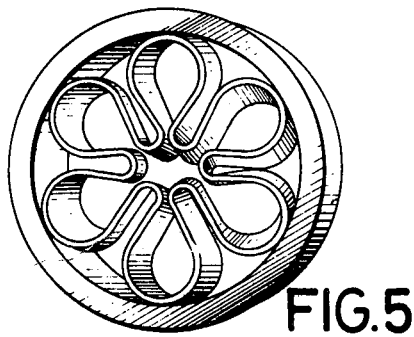
FIG. 5 shows an annular body with a conical cross sectional profile for stabilization of the ring axis in the direction of movement, and is provided with a rosette arrangement secured within the confines of the annular body.
Figure 6:
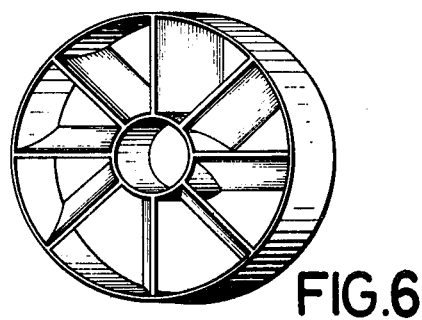
FIG. 6 illustrates a perforated hollow sphere or ball forming a casing or jacket for sponge or balled-up, snarled material layered reactively or reactive in itself.
Figure 7:
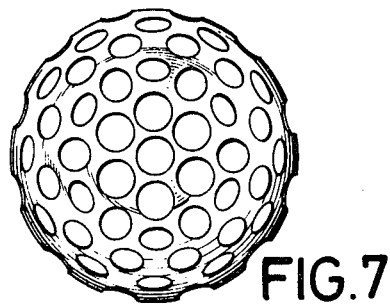
FIG. 7 shows an annular body provided with twist-guide surfaces which extend essentially radially but not axially parallel to force an automatic spinning or twist movement in accordance with the present invention.
Figure 8:
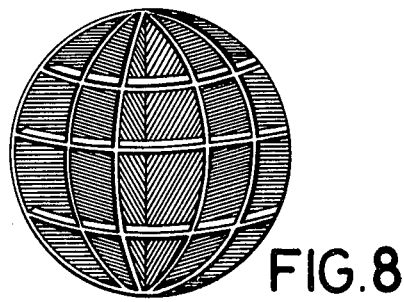
FIG. 8 shows a further embodiment having two or more discs extending vertically with respect to each other to generate a body framework with additional crossbeams or curved pieces to protect against contact with neighboring parts in accordance with the teaching of the present invention.

Referring now to the drawings in detail, the net, screen, mesh or grid provides filling surfaces within the annular body according to the illustration of FIG. 1. FIG. 2 shows concentric rings with radial struts. FIG. 4 is an additional variation. Annular bodies having a conical cross sectional profile or an additional ring for stabilization of the ring axis in the direction of movement are shown in FIGS. 3 and 5. FIG. 5 also shows a rosette arrangement of foil reactively layered on both sides to enlarge the enrichment active upper surface. FIG. 6 illustrates built-in twist-guide surfaces which extend in essence radially, but not axially parallel, to force an automatic spinning or spiral movement during rising of the carrier body. FIG. 7 illustrates a configuration of a carrier body diverging from the annular form by having a perforated hollow sphere or ball forming a casing or jacket for sponge-type or balled up, snarled or skein-like reactive material or reactively layered material. A further embodiment is shown in FIG. 8 and is formed by interfitted discs or annular plates which in the simple form includes two or three discs extending vertically to each other while generating a body framework, the rebound surfaces of which are protected against contact with adjacent particles by additional brackets or curved arc members. These carrier bodies are described in further detail in the German disclosure and corresponding U.S. application Ser. No. 104,812 filed concurrently herewith, as mentioned previously herewith in this specification.

The carrier bodies used in accordance with the present invention have a density less than that of water, and are discharged at a predetermined depth in a water layer which is to be depleted. The carrier bodies, as a consequence of the lift capability thereof, move to the water level or upper surface, where the carrier bodies are collected and elutriated, or are treated in a different manner, to recover trace material concentrated on the surfaces of the carrier bodies.

The water layer, which is located between the carrier discharge at a predetermined water depth and the catching-up or collecting at the water surface, is subjected to a continuous depletion corresponding to the trace material concentration on the carrier bodies, and the water layer accordingly should be continuously renewed, which is attained by a continuous relative movement between the outlet and collection on the one hand and the water layer on the other hand. Such a relative movement can be brought about either thereby that the carrier body discharge and collection are drawn or pulled through the water by a boat, or by arranging the devices in a natural water flow or current.

Figure 9:
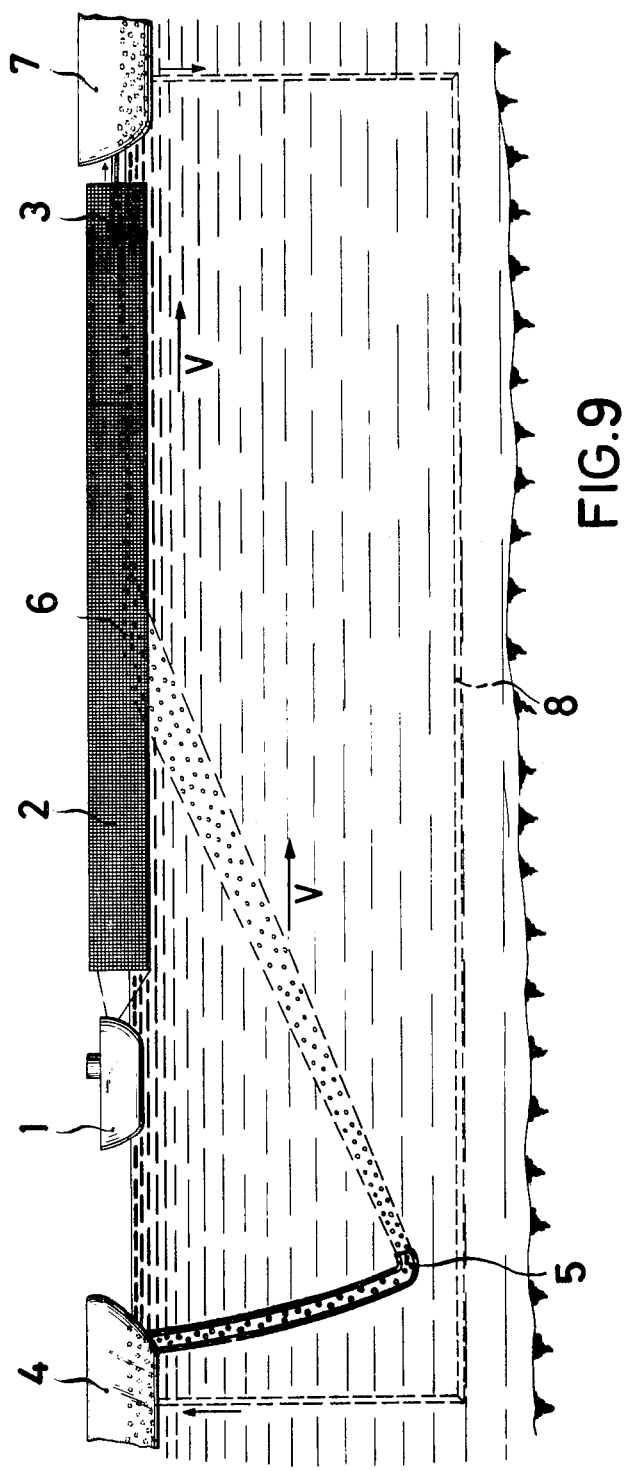
FIG. 9 is a side elevational view of a trace material concentration plant in accordance with the present invention.

According to FIGS. 9 and 10, two ships or boats 1 hold a mesh or net-type grid 2 floating upon the water level or upper surface of the water. The grid 2 terminates in the form of a narrowed end 3. Two ships 4 hold a carrier body outlet or discharge 5 suspended in water; carrier bodies discharge into the water at the desired water depth from this outlet.

By means of the relative movement of the boats or ships, or the outlet and catch-up or collecting devices, relative to the water, the water layer, into which the carrier bodies are discharged is continuously renewed, and the vertical component of the carrier body movement is superimposed by the horizontal component relative to the outlet and catch-up collector devices. Such superimposed horizontal component is brought about by the corresponding flow speed of the water or a corresponding traveling speed of the ships or boats.

The carrier bodies reach the water level or upper surface in the area or region 6 within the upper surface grid 2. The relative movement finally effects or brings about that the carrier bodies driven against the upper surface collect in the area or region 3, from which the carrier bodies are continually withdrawn, for instance by a ship 7. When the carrier bodies are sufficiently loaded or charged with trace material after traversing the water layer, they can be regenerated in the ship or boat 7, and either subsequent thereto or directly returned to the ships or the outlet 5, for instance by way of a pipeline 8 extending under the water.

For receiving the adsorber particles which have arrived in the area or region 3, the following possibilities exist:

(1) the particles are suctioned from the closed grid at the upper surface;

(2) the grid is opened at the end of the area or region 3, so that the grid is effective like an upper surface funnel which becomes narrower. The flow or stream of particles floating on the upper surface passes directly into a receiving hatch or louver, which is located at the bow of a ship.

A numerical example for recovering uranium from sea water illustrates the dimensions of such a plant.

With a desired production rate of one ton of uranium per day, a starting concentration in natural sea water of $3.3 \times 10^{-9}$ tons uranium per ton sea water, and a desired depletion of around 30%, $10^9$ tons of sea water per day must be brought into intimate contact with suitable adsorber particles. The water volume which according to the described method is daily brought into contact with the introducer adsorber particles is $V = B \times T \times v \times t$, where B is the width of the discharge opening (5), T is the depth of this opening below water, v is the relative speed between the opening 5 and the surrounding water, and t is the time (one day). With values of B=150 meters, T=150 meters, v=0.5 meters per second, and $t \approx 10^5$s (1 day), the goal of $10^9$ tons per day is achieved.

If the adsorber particles are so produced that the lift speed thereof is approximately 0.1 meters per second, the lift or rising time thereof amounts to approximately 1,000 seconds rounded off. For the lateral drift or lateral diffusion in the upper surface water of the sea, an effective "diffusion constant" between 0.1 and 1 (m²/s) square meters per second can be assumed. This would lead to the diameter of the lift area or region 6 relative to the outlet 5 on both sides experiencing an additional widening or spreading of approximately 20 meters. If the catching or collecting grid 2 is given an opening width of approximately 500 meters, no loss is to be feared by particles coming to the upper surface outside the catching or collecting device. A possible leakage rate of the first catching or collecting grid can also be countered by installation of a second catching or collecting grid located further outwardly.

The carrier body quantity which must be delivered per unit of time from the discharge depends particularly upon the loading or charging kinetic of the carrier bodies, proceeding on the basis that within the lift or rising time (for instance 1,000 seconds), a sufficient depletion is to occur in the water layer which is involved in this proceeding. Principally, as carrier bodies, all chemically suitable adsorbers or accumulation active substances can be used which themselves, or worked in with the corresponding light carrier material, fulfill the lifting or rising requirements.

From the treatment or processing, the regenerated carrier bodies are transported to the discharge ship 4 by pipe conduits or by ship.

The present invention is, of course, in no way restricted to the specific disclosure of the specification and drawings, but also encompasses any modifications within the scope of the appended claims.

What we claim is:

1. A method of recovering dissolved trace material from naturally occurring bodies of water, by accumulation of said trace materials on carrier bodies, which method includes in combination the steps of:
   discharging carrier bodies having a density less than that of said water from a discharge station positioned at a selected depth in said water;
   allowing said discharged carrier bodies to traverse said water, while simultaneously rising toward the surface of the water and accumulating said trace material;
   collecting said carrier bodies loaded with trace material from said water, said carrier bodies moving through said water in a continuous traverse movement between said discharge station and the point at which said carrier bodies are collected; and
   conveying said collected carrier bodies loaded with trace material to a further location for the isolation of trace material therefrom.

2. A method according to claim 1, which includes the steps of depleting said carrier bodies and discharging them again into the water.

3. A method according to claim 2, which includes the steps of providing carrier bodies of porous material having a surface with concentration-active centers and permitting accessibility to said water, and also protecting against mechanical influence from adjacent carrier bodies.

4. A method according to claim 3, which includes the step of providing annular carrier bodies.

5. A method of concentrating a trace material dissolved in a body of water having a layer with a natural current by accumulation of the trace material on the surface areas of carrier bodies having a density less than that of water, the method comprising the steps of:
   discharging the carrier bodies into the body of water at a discharge station positioned at a selected depth in the layer;
   allowing the carrier bodies to rise vertically through the layer while being transported horizontally by the current;
   accumulating the trace material on the exposed surface areas of the carrier bodies by adsorption as the carrier bodies rise and are transported;
   collecting the carrier bodies downstream of the discharging station after the carrier bodies have risen through the layer and have accumulated trace materials thereon;
   removing trace material from the carrier bodies after the carrier bodies have been collected; and
   returning the carrier bodies with the trace material removed therefrom upstream to the discharge station for subsequent discharge to again adsorb trace material in the layer of the body of water as the current brings additional trace material into proximity with the carrier bodies.

6. A method of concentrating a trace material dissolved in a body of water having a layer with a natural current by accumulation of the trace material on the surface areas of carrier bodies having a density less than that of water, the method comprising the steps of:
   discharging the carrier bodies into the body of water at a discharge station positioned at a selected depth in the layer, said body of water being sea water;
   allowing the carrier bodies to rise vertically through the layer while being transported horizontally by the current;
   accumulating the trace material on the exposed surface areas of the carrier bodies by adsorption as the carrier bodies rise and are transported, said trace material being uranium;
   collecting the carrier bodies downstream of the discharging station after the carrier bodies have risen through the layer and have accumulated trace materials thereon;
   removing trace material from the carrier bodies after the carrier bodies have been collected; and
   returning the carrier bodies with the trace material removed therefrom upstream to the discharge station for subsequent discharge to again adsorb trace material in the layer of the body of water as the current brings additional trace material into proximity with the carrier bodies.

7. The method of claim 6 wherein the surface area of each carrier body substantially exceeds the exterior dimensions of the bodies wherein collisions between the bodies do not discharge substantial amounts of trace material.

8. The method of claim 6 wherein the carrier bodies are annular.

9. The method of claim 6 wherein the carrier bodies are porous.

10. Apparatus for concentrating trace materials dissolved in a body of water having a layer with a natural current, the apparatus comprising in combination:

a multiplicity of carrier bodies each having a density which is less than the density of water and each having a surface area for adsorbing the trace materials thereon;

means for conveying downwardly the carrier bodies through the layer to a location spaced from the surface of the body of water and means for releasing the carrier bodies to float upward through the layer toward the surface while being carried downstream by the natural current in order to adsorb the trace material thereon;

means downstream from the releasing means for collecting the carrier bodies after the carrier bodies have adsorbed the trace material;

means for removing the trace material from the carrier bodies; and means for returning the carrier bodies upstream to the means for conveying the carrier bodies downwardly to again collect the trace material.

11. The apparatus of claim 10 wherein the collecting means is on the surface of the body of water and converges toward the trace material removing means.

12. The apparatus of claim 10 or 11 wherein the carrier bodies each have a surface area which greatly exceeds the exterior boundaries of the carrier bodies whereby substantial portions of the trace material are not dislodged upon collision of the carrier bodies.

* * * * *